(12) United States Patent
Sreemanthula et al.

(10) Patent No.: US 7,263,067 B2
(45) Date of Patent: Aug. 28, 2007

(54) METHOD AND APPARATUS FOR ACCELERATING THROUGHPUT IN A WIRELESS OR OTHER TELECOMMUNICATION SYSTEM

(75) Inventors: Srinivas Sreemanthula, Flower Mound, TX (US); Yogesh Swami, Irving, TX (US); Khiem Le, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 187 days.

(21) Appl. No.: 10/621,257

(22) Filed: Jul. 15, 2003

(65) Prior Publication Data

US 2005/0013245 A1 Jan. 20, 2005

(51) Int. Cl.
*H04L 12/26* (2006.01)
*H04L 12/28* (2006.01)

(52) U.S. Cl. ...................... 370/236; 370/231
(58) Field of Classification Search .............. 370/231, 370/229, 230, 235, 236; 709/224, 232, 235
See application file for complete search history.

(56) References Cited

U.S. PATENT DOCUMENTS

| | | | | |
|---|---|---|---|---|
| 5,313,454 | A * | 5/1994 | Bustini et al. ............. 370/231 |
| 6,105,064 | A * | 8/2000 | Davis et al. ............... 709/224 |
| 6,205,120 | B1 * | 3/2001 | Packer et al. .............. 370/235 |
| 6,212,360 | B1 * | 4/2001 | Fleming et al. ........... 455/13.4 |
| 6,493,316 | B1 * | 12/2002 | Chapman et al. .......... 370/231 |
| 6,512,743 | B1 * | 1/2003 | Fang ........................ 370/232 |
| 6,625,118 | B1 * | 9/2003 | Hadi Salim et al. ....... 370/229 |
| 6,646,987 | B1 * | 11/2003 | Qaddoura ................. 370/231 |
| 6,754,200 | B1 * | 6/2004 | Nishimura et al. ........ 370/349 |
| 6,996,626 | B1 * | 2/2006 | Smith ....................... 709/232 |
| 2001/0032269 | A1 * | 10/2001 | Wilson ...................... 709/235 |
| 2003/0112754 | A1 * | 6/2003 | Ramani et al. ............ 370/230 |
| 2003/0135638 | A1 * | 7/2003 | Brabson et al. ........... 709/232 |
| 2003/0149785 | A1 * | 8/2003 | Gerla et al. ............... 709/232 |
| 2003/0152032 | A1 * | 8/2003 | Yanagihara et al. ..... 370/236.1 |
| 2003/0156542 | A1 * | 8/2003 | Connor ..................... 370/236 |

(Continued)

OTHER PUBLICATIONS

W. Richard Stevens, RFC 2001, Jan. 1997.*

(Continued)

*Primary Examiner*—Andrew C. Lee
*Assistant Examiner*—Clemence Han
(74) *Attorney, Agent, or Firm*—Ware, Fressola, Van Der Sluys & Adolphson LLP (57) ABSTRACT

A method and equipment for accelerating throughput of communication segments from a sender (30) to a receiver (40) each of which include a protocol layer (30a 40a) for providing such segments, the method in case of TCP including a first step (20a) in which the sender protocol layer (30a) initializes a congestion window (cwnd) to some initial size (iwnd) and increases the congestion window by one segment each time it receives an ACK, but upon receiving an indication of low congestion, performs a step (20c) of accelerated start in which it sets a slow start threshold (SSTHRES) to a standard initial value (typically 65535) and re-initializes cwnd to a new value, and the sender protocol layer (30a) then increments cwnd at one or another predetermined rate—depending on whether the start immediately follows a new connection or instead follows a transfer of an existing connection to a new path—in respect to received ACKs.

18 Claims, 9 Drawing Sheets

U.S. PATENT DOCUMENTS

2005/0018617 A1* 1/2005 Jin et al. .................... 370/252
2006/0026004 A1* 2/2006 Van Nieuwenhuizen ....... 705/1

OTHER PUBLICATIONS

RFC 2581, Allman, et. al., Category: Stnadards Track, *TCP Congestion Control*, Apr. 1999.
RFC 2481, Ramakrishnan et al., Category: Experimental, *A Proposal to add Explicit Congestion Notification (ECN) to IP*, Jan. 1999.
Nokia Research Center, Beijing IPR, Technical Report, Dongmei Zhang et al., *TCP Optimization in IP RAN; A study on the Candidate Schemes*, May 2001.
Draft-MBIT, *Lightweight Mobility Detection and Response (LMDR) Algorithm for CTP*, Yogesh Prem Swami, et al., http://www.ietf.org/internet-drafts/draft-swampi-tcp-imdr-00.txt, Sep. 2003.

* cited by examiner

METHOD AND APPARATUS FOR ACCELERATING THROUGHPUT IN A WIRELESS OR OTHER TELECOMMUNICATION SYSTEM

TECHNICAL FIELD

The present invention relates to telecommunication applications including e.g. streaming protocols such as RTP (Real Time Protocol) and the newly emerging DCCP (Datagram Congestion Control Protocol) for which it is beneficial for the sending application to optimally adjust its transmission rate to operate at the highest possible throughput with minimal congestion. More particularly, the present invention pertains to throughput and congestion optimization for TCP (Transmission Control Protocol) and streaming protocol applications in fixed and mobile environments.

DISCUSSION OF RELATED ART

Current TCP/IP (Transmission Control Protocol/Internet Protocol) applications use congestion detection mechanisms to determine the congestion status on the path between the sender and receiver and control congestion by adopting well-known rate control mechanisms at the TCP sender side. Congestion is deemed to happen when packet loss is detected, e.g. through time-out at the sender, duplicate ACKs (acknowledgements) (as in RFC2581), or when some other congestion indication (as in RFC2481) is received.

However, the current TCP implicitly assumes that the TCP sender and receiver are fixed, and therefore the path between the TCP sender and receiver remains the same over the life of a TCP connection. With mobility, that assumption does not hold. Because the path can change, the congestion status on the new path may be quite different from the one on the old path, and current TCP is not designed to cope with such a wide fluctuation in congestion. A new proposal has emerged—LIGHTWEIGHT MOBILITY DETECTION AND RESPONSE (LMDR) ALGORITHM FOR TCP, by Yogesh Prem Swami and Khiem Le (two of the inventors of the present invention), March 2003, hereinafter DRAFT-MBIT (provided as a proposal to the IETF (standards body) for consideration, available at: http://www.ietf.org/internet-drafts/draft-swami-tcp-lmdr-00.txt)—in which the receiver flips a bit (M bit) in the TCP header whenever it detects a path change. The TCP sender interprets a change in the M bit value as a notification of path change, and can reassess the congestion state on the new path and if necessary, modify its transmission rate. DRAFT-MBIT is designed to work generically on the Internet, and therefore makes no assumption on the new path. A cautious approach is taken, whereby the sender transmission window is reduced and gradually increased until congestion is detected.

With a cautious approach, a path change will always result in slowing the transmission rates at the sender, at least initially. However, it is possible that the new path can support higher throughputs than the old path. This could be the case if the new path has low congestion and/or higher bandwidth on the access (e.g. the terminal has moved from cellular to WLAN). Although TCP is able to adjust, it may take several RTT before all the available bandwidth is utilized. This is due to the congestion avoidance mechanisms defined in TCP [RFC2581] where the congestion window is increased slowly, i.e. by at most 1 MSS (maximal segment size) for every RTT round trip time). In those cases, it is not optimal to reduce the transmission rate (even if only initially), and gradually increase it.

In addition, the regular TCP slow start (even without terminal mobility) with a small initial congestion window results in a significant throughput slowdown. However, it is still adopted in the Internet as a cautious approach to probe the network. This is a particularly severe problem for short-lived connections where there is no time to amortize the cost of slow start. Also the throughput suffers where the RTT can be large, as in the case of cellular systems.

Currently, for the Internet, there are proposals to inform the TCP sender of network congestion in any path, proposals such as in RFC2581 and as in Explicit Congestion Notification from RFC2481, but these proposals fail to specifically take mobility into account. Other proposals refer to solutions tied to specific mobility protocols (Mobile IPv6) but they only consider radio link throughput, not end-to-end cases. In one of the proposals, the authors estimate the delay-bandwidth product on the wireless link (not the end-to-end delay bandwidth) and use this information to adjust the TCP sender's congestion window. However, the delay-bandwidth-product on the wireless link does not indicate the congestion state of the network; it only informs about the capacity of that particular link. Additionally, DRAFT-MBIT proposes that a path change indication be sent in case of a path change, thus advising the TCP sender to slow down the sending rate.

What is needed is a way for a sender to make use of a notification of low congestion so as to have as high a rate of transmission as is reasonable under existing conditions. Ideally, what is also needed are additional or improved mechanisms for providing a notification of low congestion.

DISCLOSURE OF THE INVENTION

Accordingly, in a first aspect of the invention, a method is provided for use in accelerating throughput of segments from a sender to a receiver, the sender and receiver each including a protocol layer for sending and receiving the segments, the method including: a step in which the sender protocol layer transmits segments at a rate of transmission and increases the rate of transmission based on feedback the sender receives from the receiver; the method characterized by: a step in which the sender receives an indication of low congestion; and a step in which, in response to the indication of low congestion, the sender increases the data transmission rate so as to achieve increased throughput.

In accord with the first aspect of the invention, the sender protocol layer may be a transport layer of TCP and in the step in which the sender protocol layer transmits segments at a rate of transmission, the sender protocol layer may start a congestion window at a size of a starting number of segments and may initially increase the congestion window by one segment each time it receives an acknowledgement for a segment it has sent. Further, in the step in which the sender increases the data transmission rate, the sender may perform an accelerated start in which the sender sets a slow start threshold to some standard initial value (typically 65535) and re-initializes the congestion window value to a new predetermined value to achieve increased throughput, and then grows the congestion window at a predetermined rate in respect to received positive acknowledgments.

Also in accord with the first aspect of the invention, the protocol layer may be a transport layer of RTCP layer or other streaming or datagram protocols.

Also in accord with the first aspect of the invention, the sender and the receiver may communicate over a path that includes a radio access network (RAN).

Also in accord with the first aspect of the invention, the sender and the receiver may communicate over a path that includes a wireless telecommunication system and may both use GPRS (General Packet Radio Service) or EGPRS (Enhanced GPRS) provided by the wireless telecommunication system.

Also in accord with the first aspect of the invention, the sender and the receiver may communicate over a path that includes a UMTS (Universal Mobile Telecommunication System) network.

Also in accord with the first aspect of the invention, the sender and the receiver may communicate over a path that includes a telecommunication network using code division multiple access (CDMA) technology or a variant.

Also in accord with the first aspect of the invention, in the step of increasing the data transmission rate, the sender protocol layer may grow the congestion window at the predetermined rate of one segment for every received positive acknowledgement, but may adjust the rate based on standard congestion principles in the event of an indication of other than low congestion.

Also in accord with the first aspect of the invention, the step of performing an accelerated start may be performed after a connection between the sender and the receiver is first established, and further, the congestion window may be initially set to a higher value than is used in standard TCP. Further, the protocol layer may be a TCP layer and the indication of low congestion may be based on the value of a bit in a header or may be otherwise provided with a received TCP SYN or TCP SYN/ACK sent to the sender by either the receiver or by an intermediate node along the communication path or by a centralized node outside or along the path.

Also in accord with the first aspect of the invention, the step of increasing the data transmission rate may be performed after transferring to a new path between the sender and the receiver for an existing connection, and further, the congestion window for the new path may be initially set to the value for the congestion window when the path transfer occurred. Further, the protocol layer may be a TCP layer and the indication of low congestion may be based on the value of a bit in a header or is otherwise provided with a received TCP ACK sent to the sender by either the receiver or by an intermediate node along the communication path or by a centralized node outside or along the path.

In a second aspect of the invention, a telecommunication device is provided including a protocol layer for sending and receiving segments, the telecommunication device also including: means by which the protocol layer transmits segments at a rate of transmission and increases the rate of transmission based on acknowledgements indicating successful receipt of the segments; the telecommunication device characterized by: means by which the telecommunication device receives an indication of low congestion; and means by which, in response to the indication of low congestion, the telecommunication device increases the data transmission rate so as to achieve increased throughput.

In accord with the second aspect of the invention, the sender protocol layer may be a transport layer of TCP and the means by which the sender protocol layer transmits segments at a rate of transmission may include means by which the sender protocol layer starts a congestion window at a size of a starting number of segments and initially increases the congestion window by one segment each time it receives an acknowledgement for a segment it has sent; and the means by which the sender increases the data transmission rate may include means by which the sender performs an accelerated start in which the sender sets a slow start threshold to some standard initial value (typically 65535) and re-initializes the congestion window value to a new predetermined value to achieve increased throughput, and then grows the congestion window at a predetermined rate in respect to received positive acknowledgments.

In a third aspect of the invention a telecommunication system is provided comprising a plurality of intermediate nodes and also a plurality of telecommunication devices, wherein at least one of the telecommunication devices includes a protocol layer for sending and receiving segments, the telecommunication device including: means by which the protocol layer transmits segments at a rate of transmission and increases the rate of transmission based on acknowledgements indicating successful receipt of the segments; the telecommunication device characterized by: means by which the based on acknowledgements indicating successful receipt of the segments receives an indication of low congestion; and means by which, in response to the indication of low congestion, the telecommunication device increases the data transmission rate so as to achieve increased throughput.

In a fourth aspect of the invention a computer program product is provided comprising: a computer readable storage structure embodying computer program code thereon for execution by a computer processor in a telecommunication device having a protocol layer for sending and receiving segments, with said computer program code including instructions for performing: a step in which the protocol, layer transmits segments at a rate of transmission and increases the rate of transmission based on acknowledgements the sender receives from the receiver; the computer program characterized by including instructions for performing: a step in which the telecommunication device receives an indication of low congestion; and a step in which, in response to the indication of low congestion, the telecommunication device increases the data transmission rate so as to achieve increased throughput.

In a fifth aspect of the invention a method is provided for use by a telecommunication device, the telecommunication device including a protocol layer for sending and receiving segments to and from another telecommunication device, the method characterized by: a step in which the telecommunication device performs a process of congestion detection; and a step in which the protocol layer transmits an indication of low congestion to the other telecommunication device.

Advantages in General
  Provides performance enhancement to both wire-line (e.g. fixed IP) and wireless networks (e.g. cellular, WLAN).
  Is useful whether communication is wireless or not in case of establishing a new connection and in case of any situation resulting in an indication of low congestion, and also, when a path is changed, as in the case of wireless communication.
  optimally adjusts the rate at which the sender transmits data so that highest throughput is achieved with minimal congestion. For low congestion, it increases sender transmission rate faster (this is a marked improvement over TCP). For high congestion, it probes network and gradually increases transmission rate.
  Congestion is end-to-end and includes radio-link and network conditions.
  The higher transmission rate results in higher radio efficiency: Some wireless radio networks can process chunks of data more efficiently over the air if transmission buffers are kept full. This invention can help to maintain the buffer occupancy at a more optimal level.

Alleviates the problem of slow start in TCP and consequently benefits short-lived connections.

Can be operated in transparent or non-transparent modes. A transparent mode involves direct communication between end points and the non-transparent mode involves initiation or modification of messages by intermediate nodes to the sender.

The two-level congestion indication (low or high) can be extended to multiple levels.

Applicable to TCP and other transport protocols, where it is desirable to optimally adjust the sender's rate. For example, streaming protocols where the RTCP can provide these indications that can enable the streaming server to stream at a better resolution video or audio content.

Adds practically no extra signalling when the congestion indication is piggybacked on TCP setup or the path change indication.

Advantages Specific to EGPRS and UTMS Applications

Uses existing GPRS/UMTS based mechanisms for: Path change detection and Indication, using Cell update and/or RA Update (no new signalling required); Buffer occupancy at the SGSN (Serving GPRS Support Node) or BSC/RNC (Base Station Controller/Radio Network Controller) reflects well the congestion on the path between the GGSN (Gateway GPRS Support Node) and the mobile terminal, since the leg between the GGSN and SGSN or BSC/RNC is lightly loaded; when the sender is located at the GGSN, (e.g. in the case of a Performance Enhancing Proxy or PEP), the buffer occupancy at the SGSN or BSC/RNC is a good estimate of the congestion on the complete path from sender to receiver. Congestion detection is pretty accurate; congestion indication uses Information Elements piggybacked on existing GPRS/UMTS protocol messages or TCP messages like SYN, SYN/Ack or Ack.

Can still work with a sender not co-located at the GGSN. In that case, on the leg between the GGSN and the sender, path change indication may use DRAFT-MBIT, and congestion indication may use various schemes, including the congestion indication schemes described below.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The description here uses the following definitions, which all have to do with TCP applications of the invention, although the invention is also of use in case of communication by TCP or any similar protocol, including e.g. streaming protocols such as RTCP or datagram protocols.

SEGMENT: A segment is any TCP/IP data or acknowledgment packet (or both), or a corresponding entity for communication according to other packet-based protocols.

RECEIVER WINDOW (rwnd) The most recently advertised receiver window.

CONGESTION WINDOW (cwnd): A TCP (or other packet-based protocol) state variable that limits the amount of data a TCP layer can send. At any given time, according to standard operating procedure, a TCP layer does not send data with a sequence number higher than the sum of the highest acknowledged sequence number and the minimum of cwnd and rwnd.

INITIAL WINDOW (iwnd): Initial size of congestion window at the sender (i.e. the size at the start of a TCP session).

OVERVIEW OF THE INVENTION

Figure 1A:
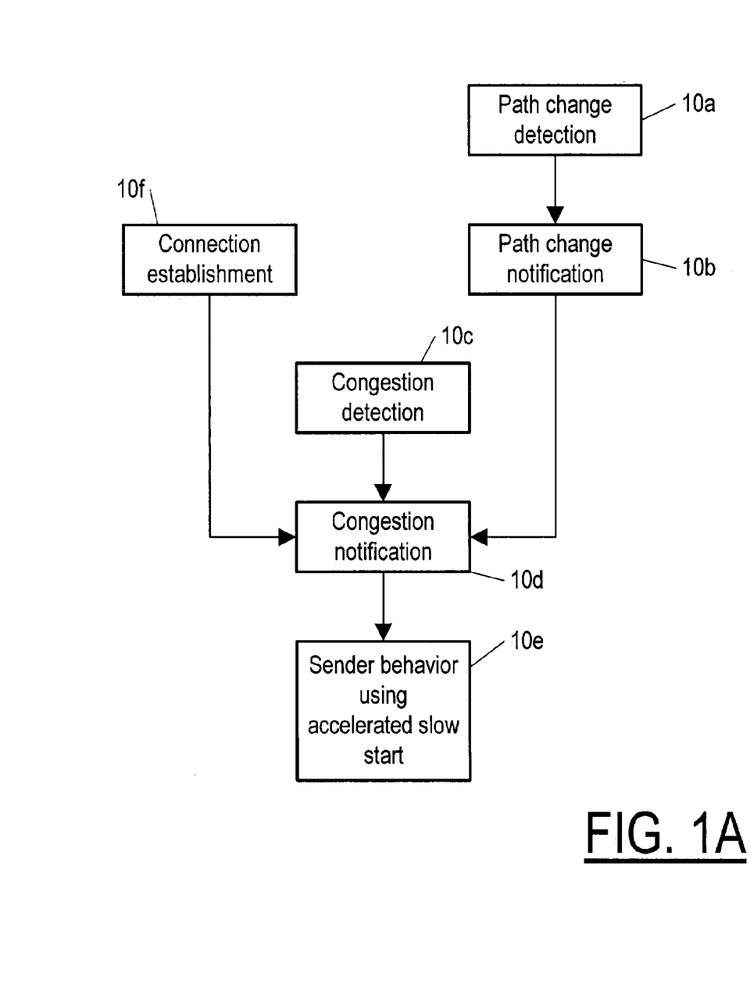
FIG. 1A is a flow chart of the overall processes relating to controlling the rate of transmission from a sender device, according to the invention.
Figure 2A:
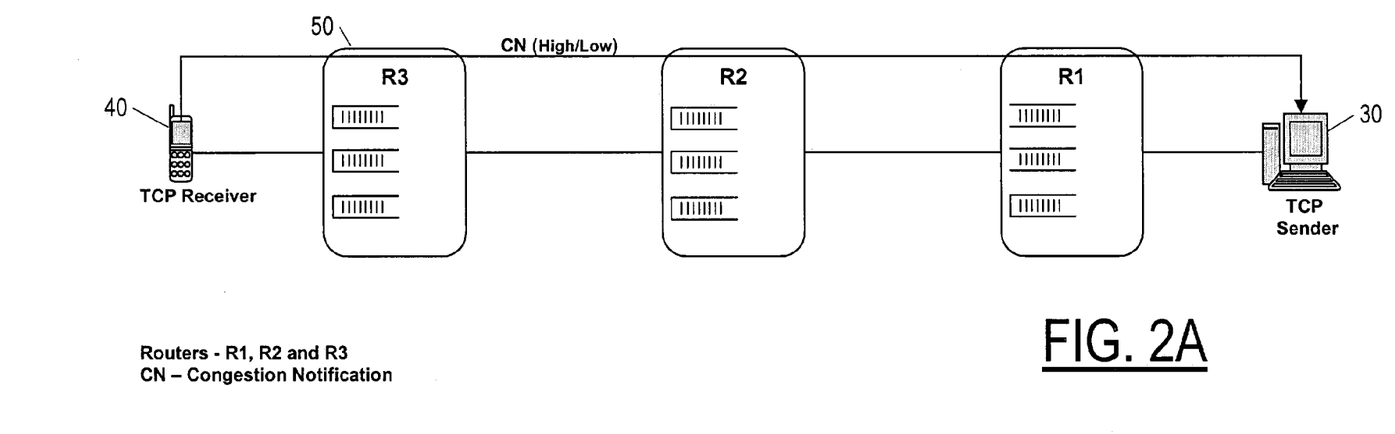
FIG. 2A is a schematic of message flow in a so-called transparent case, in which messages are passed through intermediate nodes without the intermediate node examining the message), providing end-to-end congestion notification.
Figure 2B:
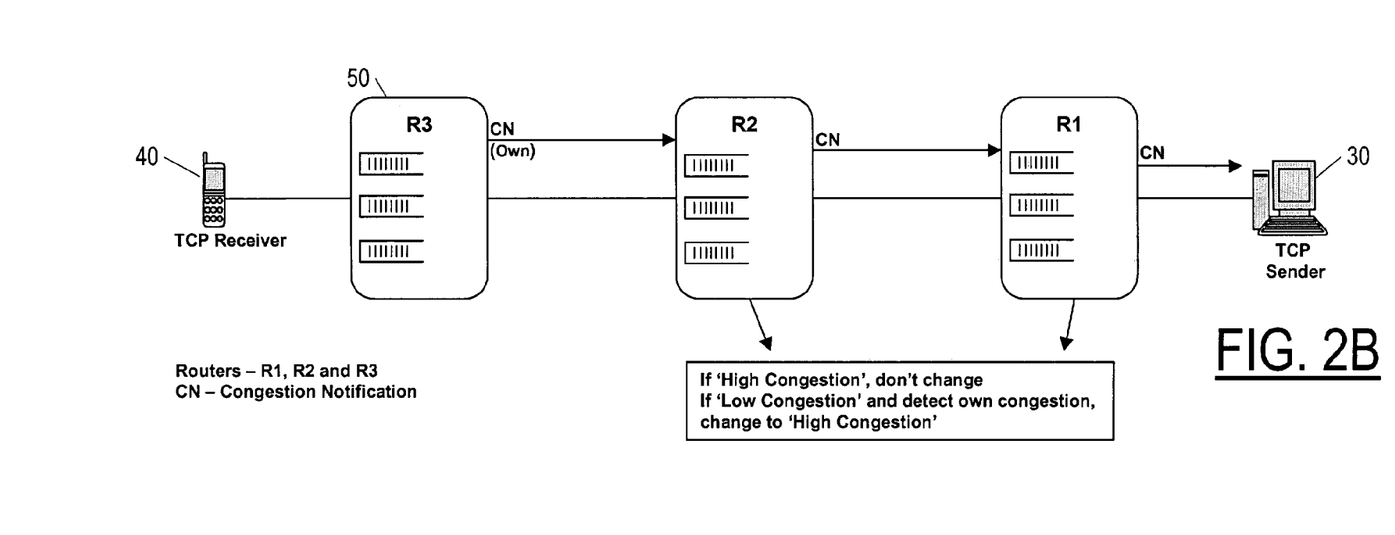
FIG. 2B is a schematic of message flow in a so-called non-transparent case, in which intermediate nodes snoop in on messages, or actually originate messages providing congestion notification.
Figure 3:
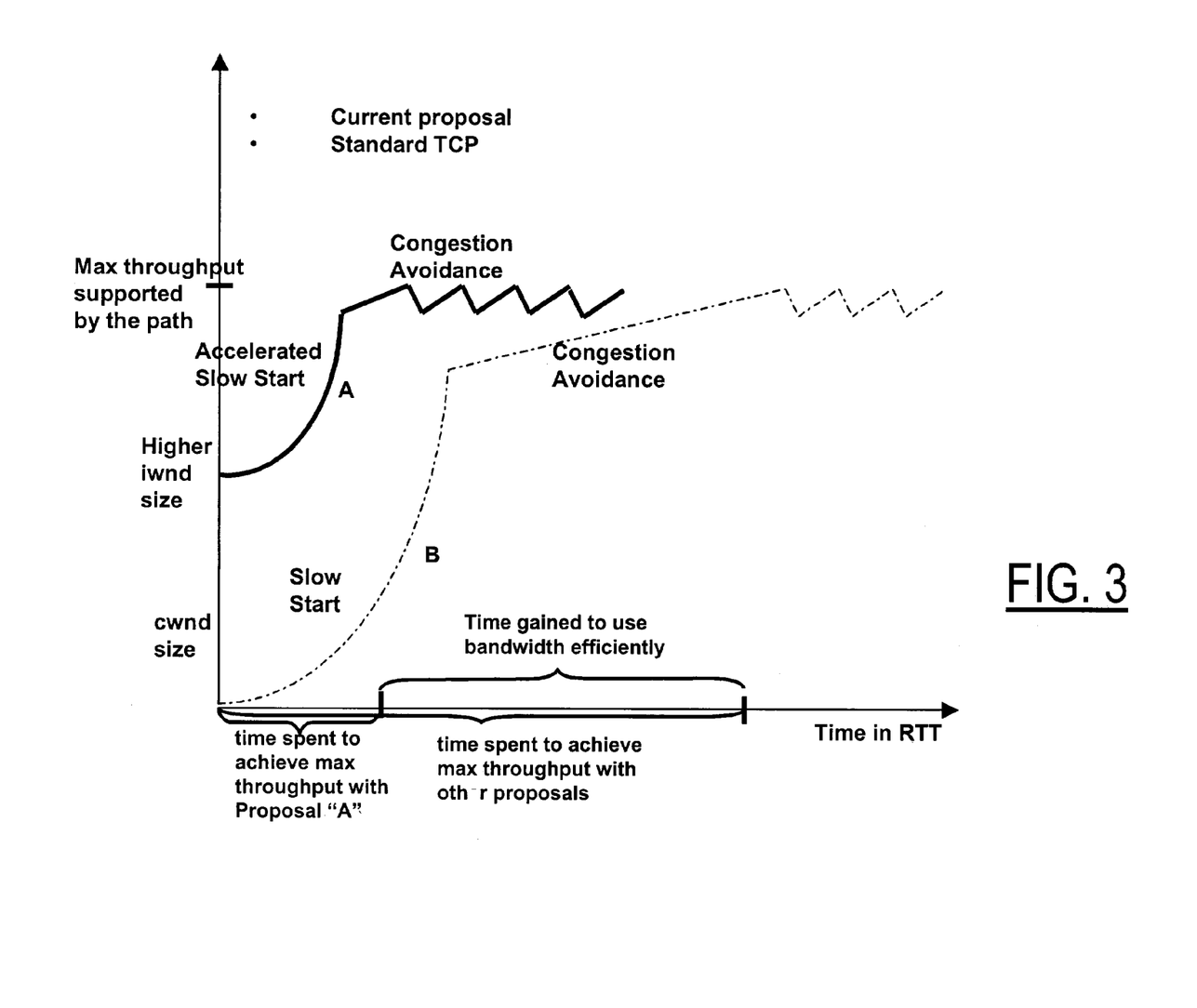
FIG. 3 is a graphical representation of timing in respect to a start of new connection in case of the invention, compared to prior art mechanisms, and showing time gain in throughput adjustment with 'Low Congestion' indication.
Figure 4:
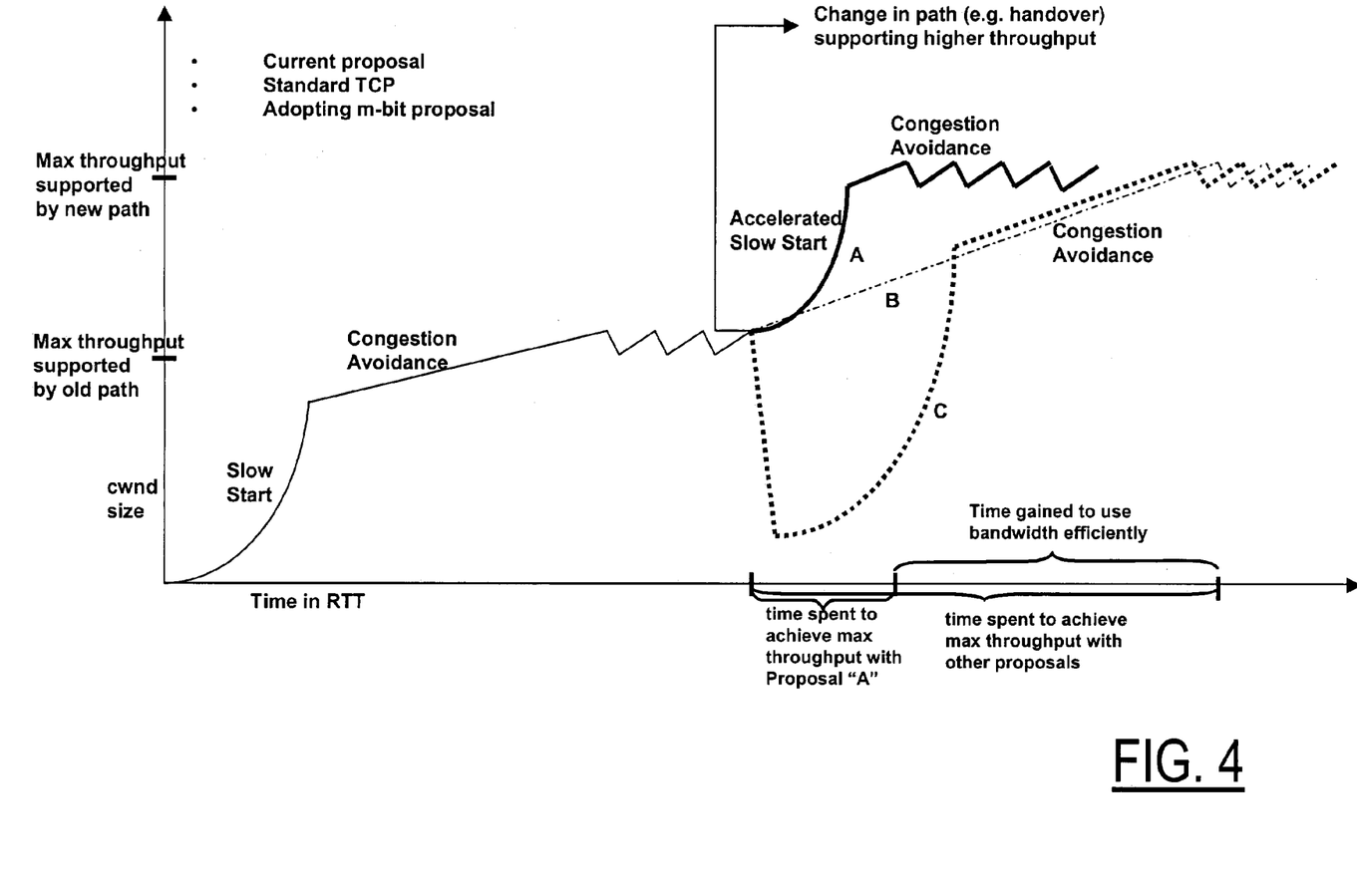
FIG. 4 is a graphical representation of timing in respect to transfer to a new path in case of the invention, compared to prior art mechanisms, and showing time gain in throughput adjustment with 'Low Congestion' indication.

Referring now to FIG. 1A, which illustrates flow sequence in case of detecting low congestion, and also to FIGS. 2A and 2B, in order to provide high throughput from a sender telecommunication device 30 to a receiver telecommunication device 40 when the communication path linking the two either changes or experiences congestion, several processes come into play:

path change detection 10a by the receiver 40 or by an intermediate node (e.g. a router) 50 along the new path linking the two;

path change notification 10b to the sender 30 from (initially) either the receiver 40 or an intermediate node 50;

congestion detection 10c by either the receiver 40 or an intermediate node 50, which is generally an ongoing process (but may be triggered by some events), and typically amounts to routine inspection of e.g. buffer queues;

congestion notification 10*d* to the sender 30 from (initially) either the receiver 40 or an intermediate node 50; connection establishment 10*f*; and receiver behavior 10*e* in response to a congestion indication.

The receiver behavior 10*e* according to the invention is to perform what is here called an accelerated start (not to be limited to have the connotation of accelerated slow start as that terminology is used in a TCP context) in response to an indication low congestion, i.e. a procedure in which the data transmission rate is started at some relatively higher value (compared to what is usual for the context) and optionally increased at a relatively higher rate and which therefore results in an acceleration of the throughput of segments from the sender 30 to the receiver 40, as compared with the throughput following a notification of congestion according to the prior art in case of wireless communication, in which communication is over a path that includes a radio access network (RAN), such as UTRAN (UMTS Terrestrial RAN). Not only does the invention provide that the receiver 30 performs an accelerated start in response to an indication of low congestion, it also provides various mechanisms by which in an indication of low congestion is provided to the sender 30, so that the other above mentioned processes 10*a*-10*d* can be according to the invention in addition to the sender behavior 10*e*. According to the invention then, in case of congestion detection 10*c* (by any means, not necessarily according to the invention) determining low congestion, congestion notification 10*d* (of low congestion) is performed (again by any means, but possibly according to the invention), resulting in sender behavior 10*e* according to the invention, i.e. the sender 30 performs an accelerated start. In case of a new connection 10*f*, congestion notification 10*d* (of low congestion) is again performed, resulting again in sender behavior 10*e* according to the invention. In case of a path change detection 10*a* (by any means, but possibly according to the invention), a path change notification 10*b* is performed (by any means, but possibly according to the invention), leading to congestion notification 10*d* (of low congestion), and resulting again in sender behavior 10*e* according to the invention.

Figure 9A:
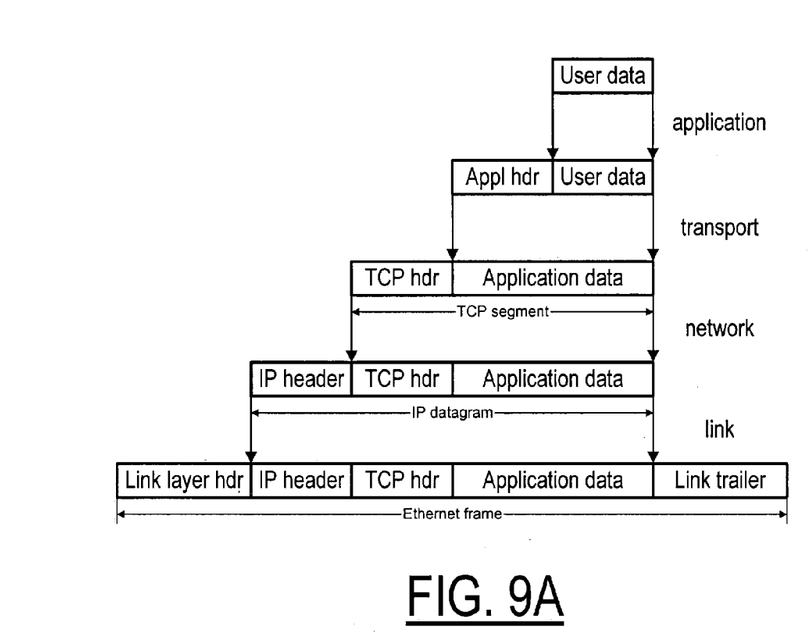
FIG. 9A is a schematic illustrating encapsulation of application data using TCP.
Figure 9B:
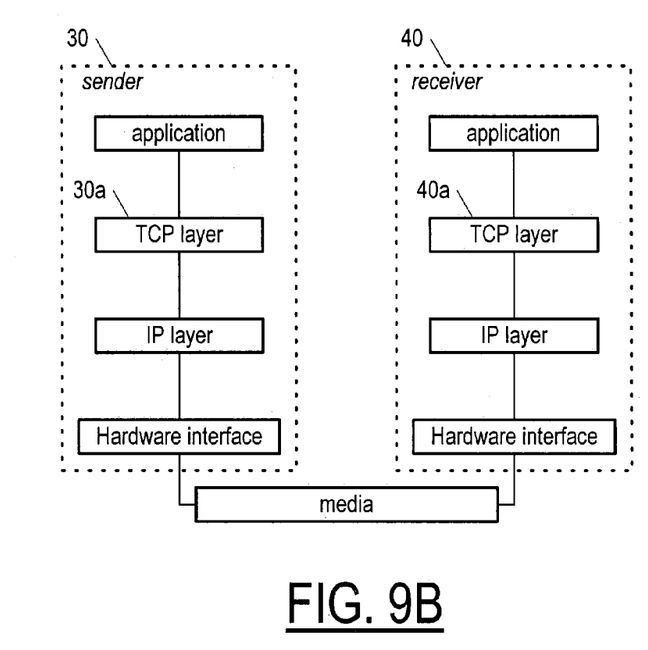
FIG. 9B is a block diagram of the sender and receiver of FIGS. 2A and 2B in more detail, showing the TCP layer of each.

As shown in FIGS. 9A and 9*b*, in case of communication by TCP, the sender 30 and receiver 40 each include a respective TCP layer 30*a* 40*a* that provides (communication) segments to an IP layer (network layer), which then provides IP datagrams to a lower layer (the link layer), all according to encapsulation procedures made standard for the protocol. The communication segments are ultimately conveyed via one or another kind of media, and the invention is of especial use in case the media is air (i.e. the communication is by radio frequency signals), for the reasons given above.

Figure 1B:
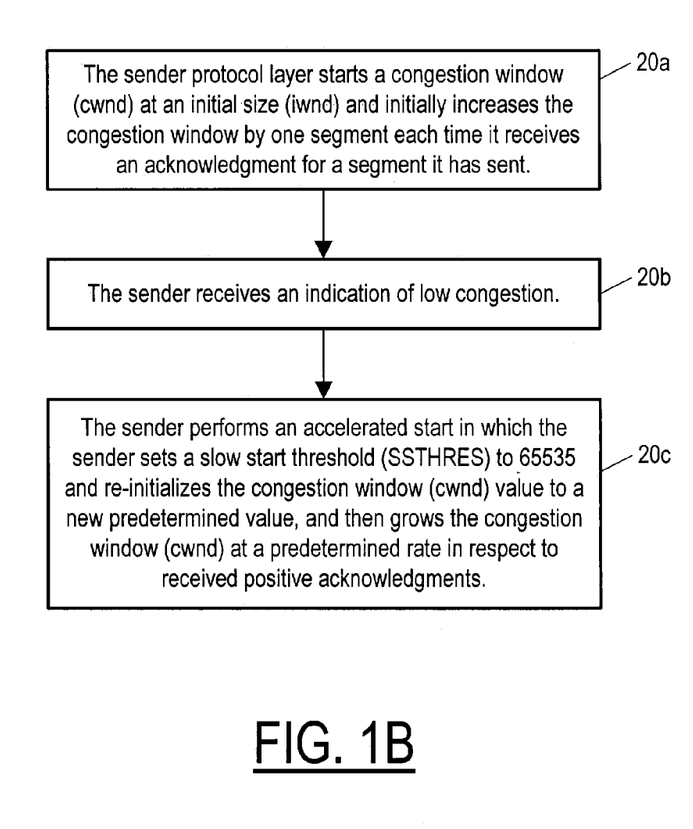
FIG. 1B is a flow chart showing the behavior of a sender, according to the invention, in response to receiving an indication of either a path change or congestion along the existing path.

Referring now to FIG. 1B, as is explained in more detail below, according to the invention, to accelerate throughput of segments from the sender 30 to the receiver 40, in a first step 20*a*, the sender 30 begins transmitting segments to the receiver at a predetermined starting rate of transmission, and increases the rate of transmission based on acknowledgments it receives from the receiver 40. In case of TCP applications, the sender protocol layer 30*a* starts a congestion window (cwnd) at some initial size (iwnd) (e.g. two or four segments) and initially increases the congestion window by one segment each time it receives an acknowledgement for a segment it has sent. In a next step 20*b*, the sender (30) receives an indication of low congestion (from either the receiver 40 or from an intermediate node 50. In a next step 20*c*, the sender 30 performs an accelerated start, i.e. the sender increases the rate of transmission by some predetermined amount, to some re-initialized starting rate of transmission, and then increases the rate of transmission at a rate of increase based on received positive acknowledgments (ACKs). In case of TCP, the sender sets a slow start threshold (SSTHRES) to 65535 and re-initializes the congestion window (cwnd) value to a new predetermined value—depending on whether a high or low congestion has occurred—and then grows the congestion window (cwnd) at a predetermined rate in respect to received positive acknowledgments (ACKs), typically one segment per received ACK.

As a matter of standard procedure according to the invention in general, the sender 30 optimally adjusts its sending rate to maximize throughput at minimal risk of causing congestion along the traffic path. When the congestion is low, the sender transmits data at a higher rate. When the congestion is high or unknown, the sender falls back to some predetermined conservative mechanism, e.g. a so-called slow start mechanism if the transport protocol is TCP, i.e. the sender 30 adheres to congestion principles from e.g. RFC2001 for congestion events due to time outs and duplicate ACKs. The general scheme provided by the invention is applicable when a new connection is started (when congestion is low, send at a faster rate than the usual slow start) or when the transmission path changes due to mobility (when congestion on the new path is low, the sender tries to increase its sending rate).

In case of a new connection, whether the terminal is mobile or not, the connection establishment acts as trigger for congestion detection/notification. (In the case of TCP, connection establishment is detected through TCP SYN (synchronize sequence numbers flag), SYN/ACK). When the sender 30 receives an indication of "low congestion," it transmits at a more aggressive rate than when no such indication is received. In the case of TCP, it increases its congestion window (cwnd) by one for every received ACK, as in existing slow start mechanisms, but starting from an initial value that is larger than the existing slow start initial window value. When a "high congestion" or no congestion indication is received, standard TCP mechanisms can be followed, gradually probing the network to attain a sustainable data rate.

In case of a path change (where the traffic is transferred to a new path providing the same connection), and so only in case of wireless telecommunication systems, the path change detection/notification acts as trigger for the congestion detection/notification. When the sender 30 receives an indication of "low congestion," it increases its sending rate. In the case of TCP, the sender increases its congestion window (cwnd) by one for every received ACK, as if in slow start, but starting from a value that is equal to the cwnd value when the path transfer occurred, rather than the slow start initial window value. Then the TCP sender transitions to congestion avoidance according to the same principles as provided by the prior art. In the absence of a "low congestion" indication (i.e. in case of either a high congestion indication or no indication at all), more cautious mechanisms can be followed, such as provided e.g. by DRAFT-MBIT, mechanisms that in general gradually probe the network to attain a sustainable data rate.

The invention is further described below in respect to the processes 10*a*-*d* other than sender behavior 10*e* first in general, and then as applied in (E)GPRS/UMTS systems, including a description of how the scheme defined in DRAFT-MBIT can be applied to (E)GPRS/UMTS.

Mechanisms for Path Change and Congestion Notifications in General

Start of New Connection

In case of a new connection (whether the terminal is mobile or not)—so that of the five processes 10a-e of FIG. 1, only congestion detection 10c, congestion notification 10d, and sender behavior 10e are involved—congestion detection 10c can be done by any entity capable of determining the congestion level on the path. This can be a collection of nodes or a single node. The receiver may be such a node. A node can determine the congestion status by monitoring e.g. its buffer occupancy.

Congestion notification 10d can be accomplished by e.g. using a single bit, and so to indicate to the sender 30 whether to increase or decrease the transmission rate, as per e.g. in DRAFT-MBIT, RFC2581 and RFC2481. A one-bit congestion indication can be conveyed to the sender 30 in various ways, including e.g. by use of a so-called experimental bit in the TCP header of a TCP SYN or TCP SYN/ACK communication; if this scheme is to be used in conjunction with the M-bit scheme (for indicating a path change), the experimental bit must of course be different from that defined by DRAFT-MBIT for indicating a path change. Another way to convey the one-bit congestion indication is by use of an option in TCP to provide one bit of information with a TCP SYN or TCP SYN/ACK communication. In addition, other signalling mechanisms can be used to convey a one-bit congestion indicator, including e.g. defining a new protocol, modifying an existing protocol, or using an existing protocol to carry the one bit of information, so long as the behavior at the sender 30 is according to the invention, i.e. accelerated start upon receiving an indication of low congestion. The invention also encompasses having a congestion indication provided to the sender 30 as a multi-bit congestion indicator, as might be conveyed using existing protocols or as might be conveyed using new, as yet undefined protocols.

The invention can be used in what is here called transparent mode and also in what is here called non-transparent mode. In transparent mode, as illustrated in FIG. 2A, the receiver 40 performs congestion detection 10c and congestion notification 10d indication low congestion. The other nodes 50 on the path transparently relay the indication (i.e. do not examine it and possibly ever change it). In non-transparent mode, as illustrated in FIG. 2B, intermediate nodes 50 snoop into the ongoing packets and generate, filter or modify congestion indications per their own criteria. An ongoing congestion indication can only be upgraded from low to high to indicate high congestion but not changed from high congestion to indicate low congestion. In other words, an intermediate node will never indicate a lower congestion condition than is indicated in a congestion notification it receives and is to forward to the sender, but in the absence of a congestion notification, will itself originate a "low congestion" indication if it determines local congestion is low. Besides having an intermediate (in-line) node 50 that is typically a router provide a congestion indication, such an indication can also be provided by a centralized node even outside or along the path. Such a centralized node could also be a router.

To avoid oscillations from "low" to "high" congestion, it is advantageous in some applications to send "low" congestion only for some predetermined fraction of the connections, or to send no more than some predetermined number of "low" congestion indications in a time window of some predetermined duration.

Also, to avoid unnecessary further loading of the network, it is advantageous in some applications to send congestion indications only when the congestion is low.

Transfer to a New Path

In case of a path change 10a, a path change detection mechanism can be implemented as defined in DRAFT-MBIT, but other mechanisms are also possible. For a path change notification 10b, a path change notification mechanism can also be implemented as defined in DRAFT-MBIT, but again, other mechanisms are possible. For congestion detection 10c, the same mechanisms as in the case of a new connection are applied on the new path. For congestion notification 10d, a congestion indication can be generated by using the same schemes as in case of a new connection, except that the TCP ACK is used instead of TCP SYN or TCP SYN/ACK. TCP ACK can be generated at the receiver 40; if needed, the receiver can repeat a previous ACK.

Implementation in (E)GPRS and UMTS Networks

Start of New Connection

For congestion detection 10c, two schemes are possible, one for UMTS and one for (E)GPRS. For UMTS, the RNC can monitor the occupancy levels in the RLC queues or other buffers at the cell level or mobile station level to determine the congestion status. For (E)GPRS, the SGSN can use information like the BVC (Base Station System GPRS Protocol (BSSGP) Virtual Connection) flow control messages from the BSC at the cell level and/or its own buffer occupancy conditions to determine the congestion status in the new cell.

For congestion notification 10d, the indicator of congestion (typically one bit) can be piggybacked over the TCP SYN, SYN/ACK, etc. by the BSC/RNC or SGSN.

Transfer to New Path

In case of a path change, for both (E)GPRS and UMTS path change detection 10a is realized as either a cell update or RA (Routing Area) update from the receiver 40. Also, for both (E)GPRS and UMTS, path change notification 10b is hierarchically informed all the way up to the GGSN depending on what paths need to be switched. If the sender 30 is separate from the GGSN, the GGSN translates the path change indication into non-GPRS-specific signalling (e.g. M-bit) destined for the sender. If the sender is collocated with the GGSN (as in e.g. PEP), the indication is consumed locally.

Congestion detection 10c is the same as in case of a new connection, and is here triggered by the path change indication.

Figure 5:
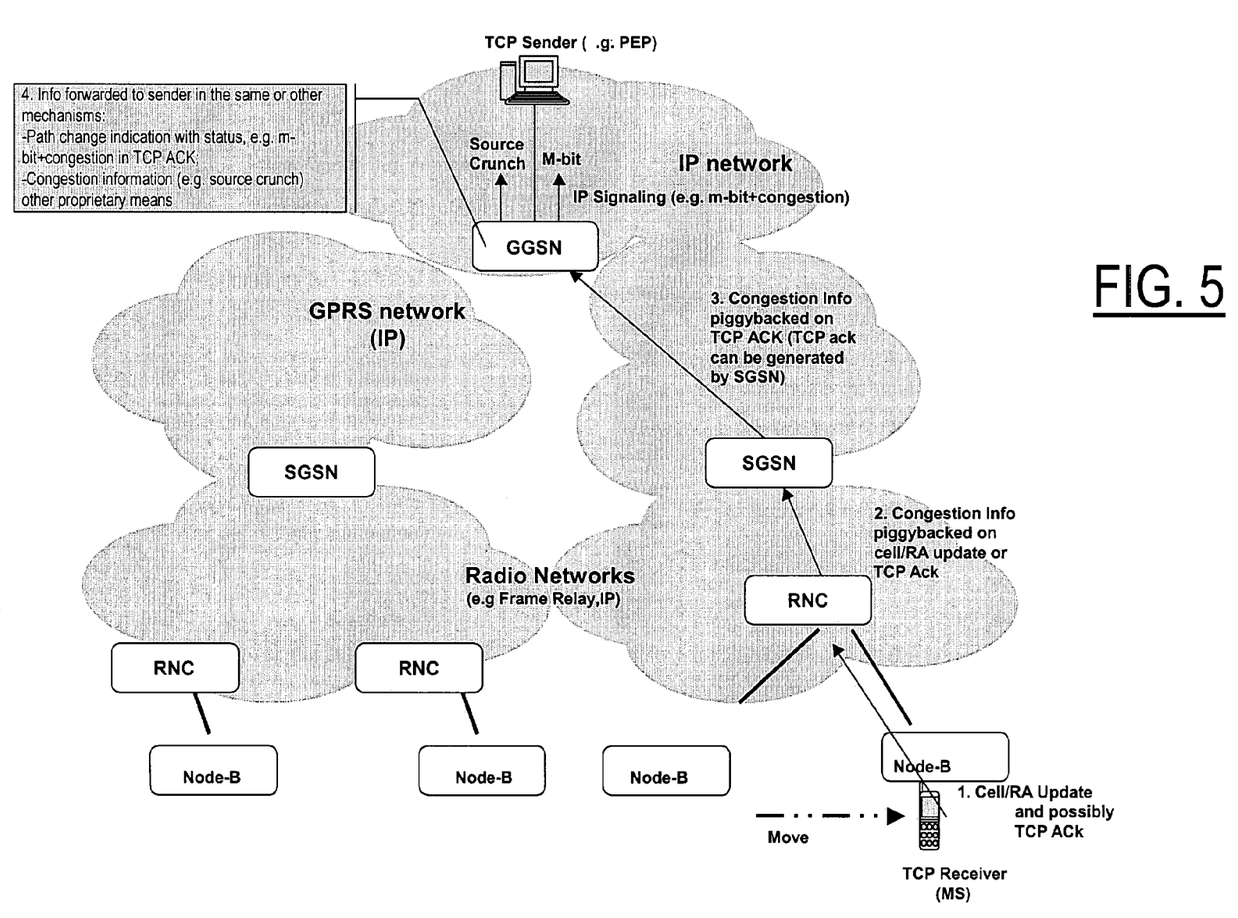
FIG. 5 is a schematic of message flow indicating low congestion in particular for UMTS in case of an intra-SGSN path change.
Figure 6:
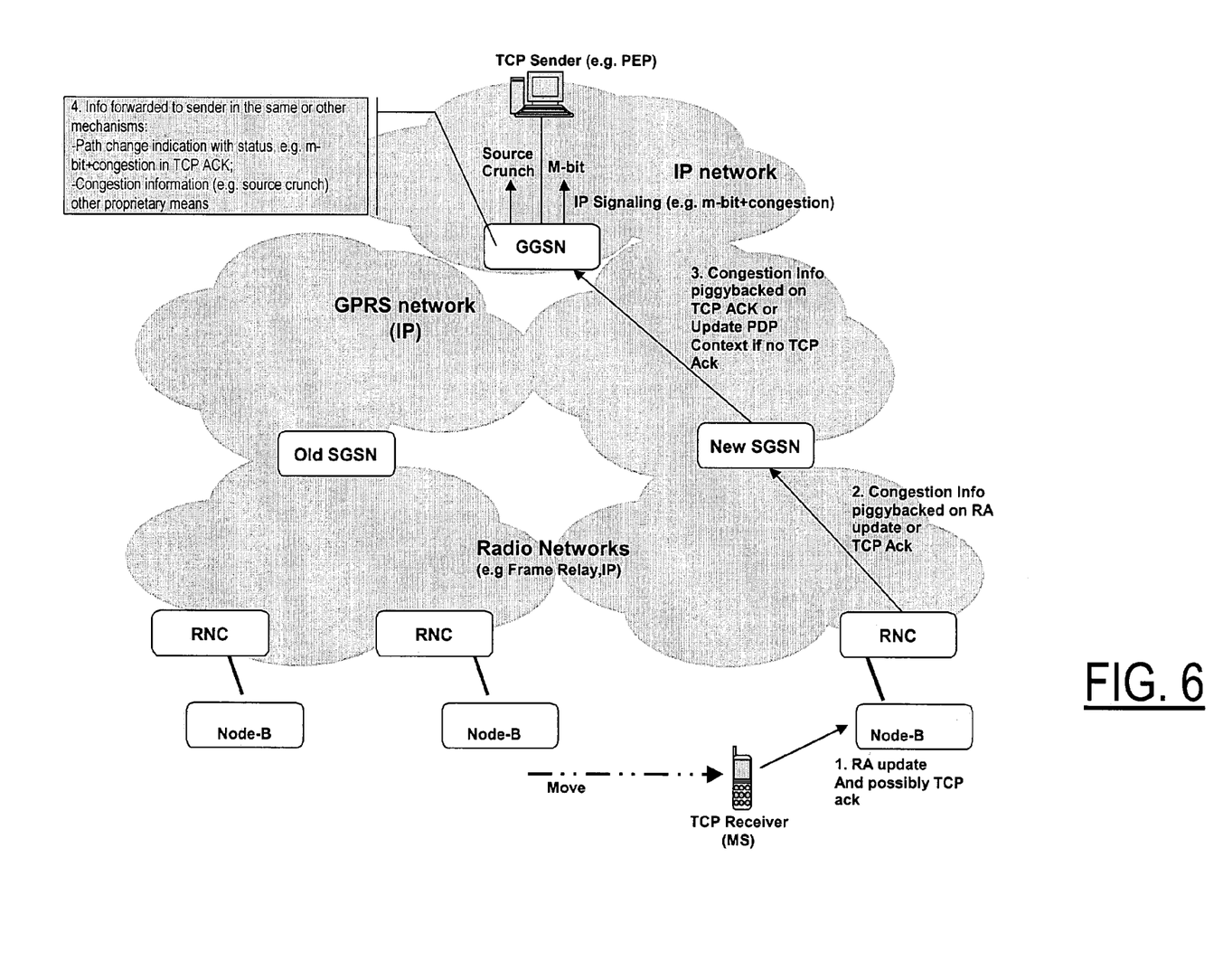
FIG. 6 is a schematic of message flow indicating low congestion in particular for UMTS in case of an inter-SGSN path change.

Congestion notification 10d (notification of low congestion) is triggered by either a cell update or a RA Update. For UMTS, the RNC piggybacks the congestion indication over the cell or RA update. In the case of intra-SGSN handoff, as illustrated in FIG. 5, the SGSN piggybacks the congestion indication on a TCP ACK. If there is no TCP ACK available from the receiver 40, the SGSN will generate the TCP ACK (by repeating a previously stored ACK). In the case of inter-SGSN handoff, as illustrated in FIG. 6, the SGSN piggybacks the congestion indication on TCP ACK (if it is available from the receiver), or on an Update PDP Context message.

Figure 7:
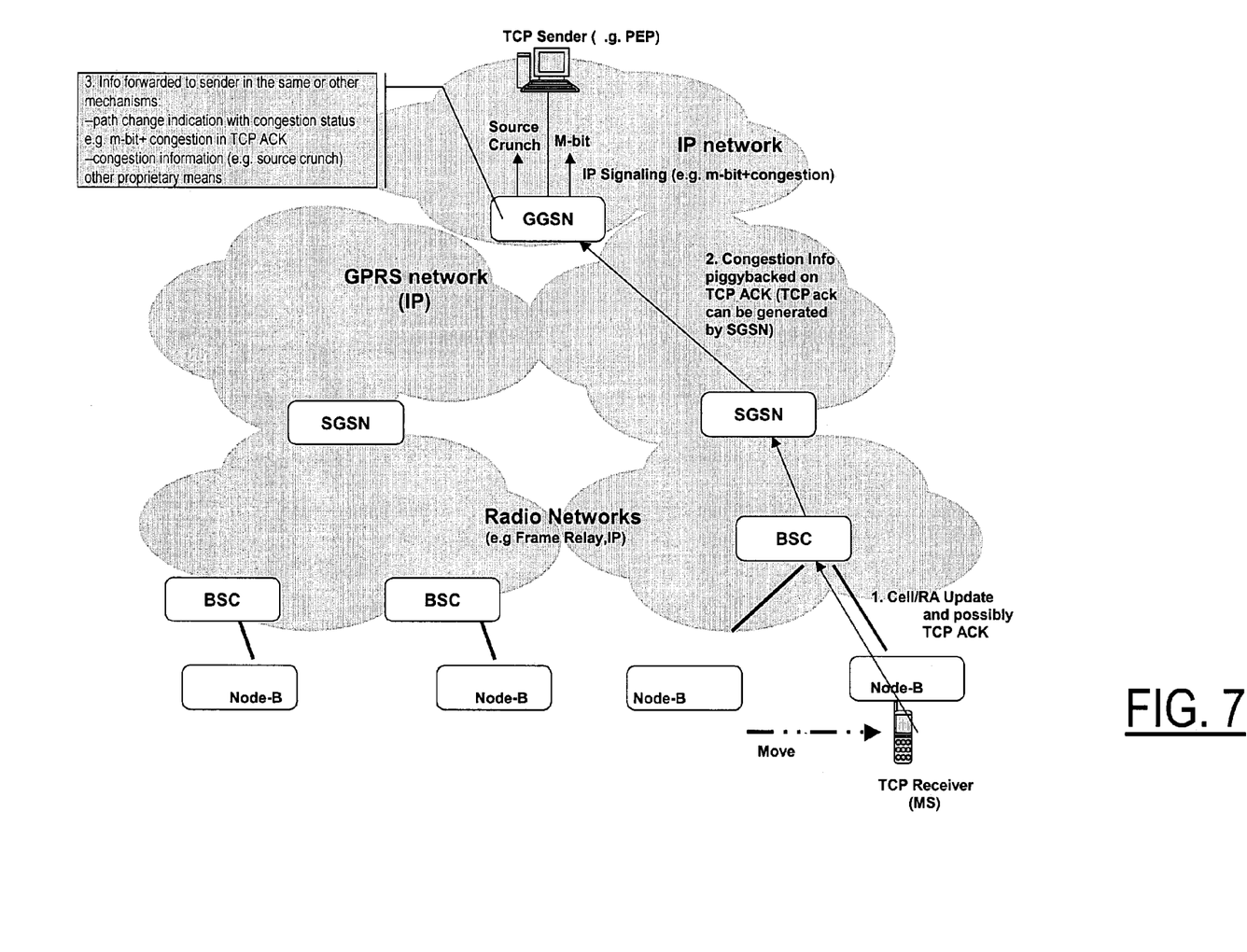
FIG. 7 is a schematic of message flow indicating low congestion in particular for (E)GPRS in case of an intra-SGSN path change.
Figure 8:
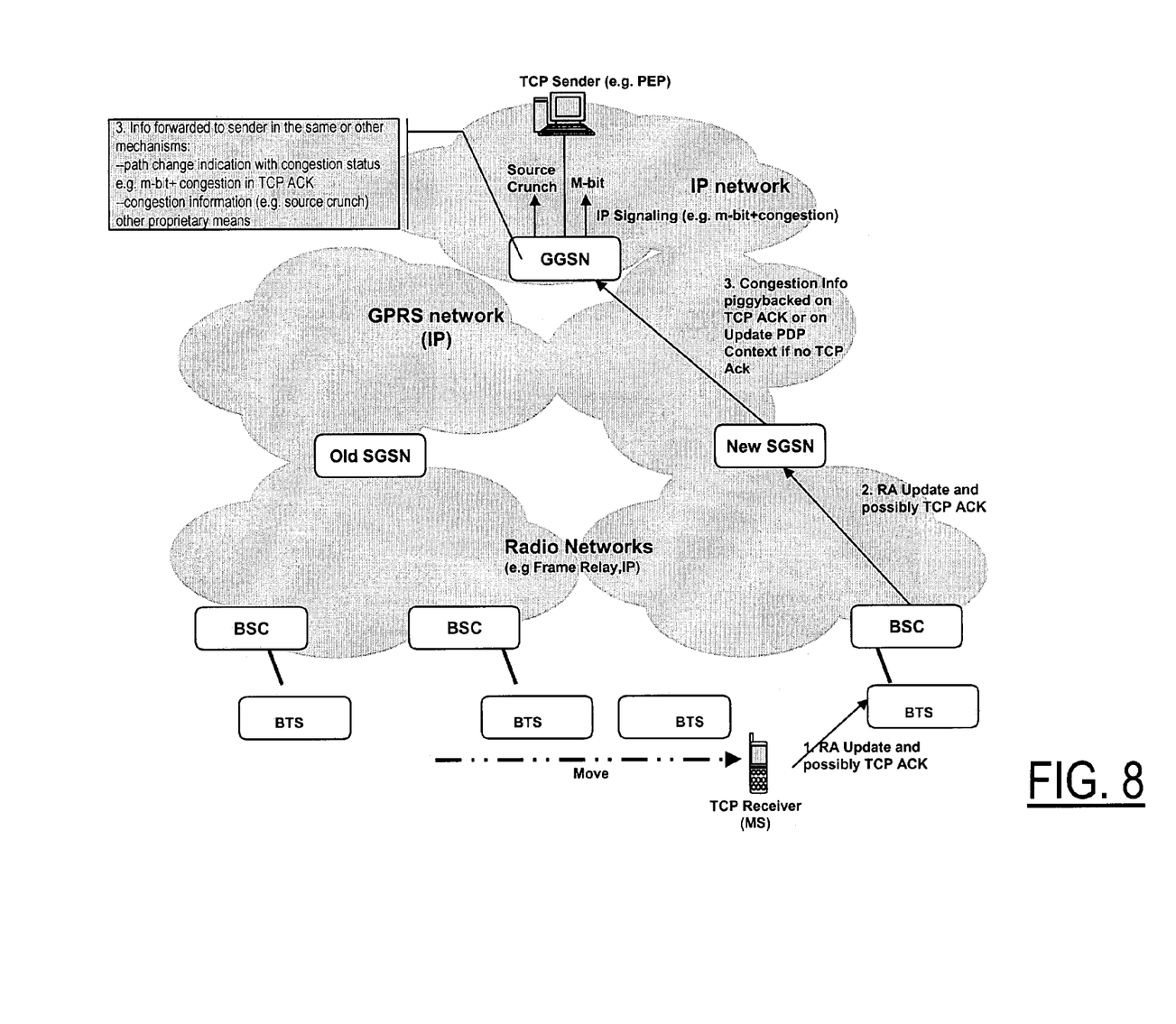
FIG. 8 is a schematic of message flow indicating low congestion in particular for (E)GPRS in case of an inter-SGSN path change.

For (E)GPRS, in case of intra-SGSN handoff, as illustrated in FIG. 7, the SGSN piggybacks the congestion indication on a TCP ACK. If there is no TCP ACK available from the receiver, the SGSN generates the TCP ACK (by repeating a previously stored ACK). In the case of inter-SGSN handoff, as illustrated in FIG. 8, the SGSN piggy-backs the congestion indication on TCP ACK (if it is available from the receiver), or on an Update PDP Context message. GGSN may choose to forward a congestion indication to the sender 30 as it is (i.e. so that the GGSN is transparent to the congestion notification process) or may instead choose to invoke other mechanisms—such as the so-called source crunch mechanism—to cause the sender to behave in a certain way. It is also possible to implement an unspecified interface to the sender (e.g. PEP) to cause the sender to behave in a certain way as defined in this invention (i.e. to perform accelerated start) and/or in DRAFT-MBIT.

Tables 1 and 2 summarize the path change and congestion processes for the different contexts described above, in case of starting a new session and in case of transferring to a new path respectively.

TABLE 1

Summary of path change and congestion processes in case of starting a new session.

|  | General | EGPRS | UMTS |
| --- | --- | --- | --- |
| Path change detection | N/A | N/A | N/A |
| Path change indication. | N/A | N/A | N/A |
| Congestion detection. | Buffer occupancy, etc. | BVC flow control combined with Buffer occupancy info at SGSN. | Buffer occupancy at RNC. |
| Congestion indication. | Experimental bit carried in TCP SYN or SYN/ACK ACK; or TCP option; or Other signaling. | Same signaling as in General, generated by SGSN. | Same signaling as in General, generated by RNC. |

TABLE 2

Summary of path change and congestion processes in case of transferring to a new path.

|  | General | EGPRS | UMTS |
| --- | --- | --- | --- |
| Path change detection. | M-Bit or similar. | Cell or RA update. | Cell or RA update. |
| Path change indication. | M-Bit or similar. | Cell or RA update. | Cell or RA update. |
| Congestion detection. | Buffer occupancy, etc. | BVC flow control combined with Buffer occupancy info at SGSN for the new path. | Buffer occupancy at RNC. |
| Congestion Indication | Experimental bit carried in TCP ACK; or TCP option; or Other signaling. | SGSN piggybacks on TCP ACK or Update PDP Context. | RNC piggybacks on Cell/RA Update or TCP ACK and SGSN piggybacks on TCP ACK or Update PDP Context. |

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method of operation for a telecommunication device, comprising:
   transmitting segments at a rate of transmission over a communication path to a receiver telecommunication device and increasing the rate of transmission starting from a first starting point for the rate of transmission, based on feedback received from the receiver telecommunication device provided as acknowledgements of the transmitted segments;
   receiving a message including one or more bits set to a value predetermined to convey an indication of low congestion irrespective of any particular one of the transmitted segments and so not providing feedback in the form of acknowledgements of the transmitted segments; and
   in response to the indication of low congestion, performing an accelerated start so as to reach maximum throughput in less time by changing to a second starting point greater than the first starting point and greater than the current rate of transmission, and increasing the rate of transmission starting from the second starting point.

2. The method of claim 1, wherein transmitting segments at a rate of transmission includes initializing a congestion window to a first starting number of segments and increasing the congestion window by a predetermined number of segments each time an acknowledgement for a segment is received.

3. The method of claim 2, wherein in performing the accelerated start the congestion window is re-initialized to a second starting number of segments greater than the first starting number of segments, and the congestion window is grown at a predetermined rate in response to received positive acknowledgments.

4. The method of claim 3, the accelerated start is performed after a connection with the receiver telecommunication device is first established.

5. The method of claim 4, wherein the indication of low congestion is based on the value of a bit in a message received from either the receiver or by an intermediate node along the communication path or by a centralized node outside or along the path.

6. The method of claim 3, wherein the accelerated start is performed after transferring to a new communication path for an existing connection with the receiver telecommunication device, and further wherein the congestion window for the new path is initially set to the value for the congestion window when the path transfer occurs.

7. The method of claim 6, wherein the indication of low congestion is based on the value of a bit in a message received from either the receiver or by an intermediate node along the communication path or by a centralized node outside or along the path.

8. The method of claim 2, wherein performing the accelerated start includes growing the congestion window at a window growth rate of one segment for every received positive acknowledgement, but adjusting the window growth rate in the event of an indication of other than low congestion.

9. A computer program product comprising: a computer readable storage structure embodying computer program code thereon for execution by a computer processor in a telecommunication device having a protocol layer for sending and receiving segments, with said computer program code including instructions for performing the method of claim 1.

10. A telecommunication device, comprising a protocol layer configured to:
- transmit segments at a rate of transmission and increasing the rate of transmission starting from a first starting point for the rate of transmission, based on feedback in the form of acknowledgements of the transmitted segments;
- receive a message including one or more bits set to a value predetermined to convey an indication of low congestion irrespective of any particular one of the transmitted segments and so not providing feedback in the form of acknowledgements of the transmitted segments; and,
- in response to the indication of low congestion, perform an accelerated start so as to reach maximum throughput in less time by changing to a second starting point greater than the first starting point and greater than the current rate of transmission, and increase the rate of transmission starting from the second starting point.

11. The telecommunication device of claim 10, wherein the protocol layer is a transport layer of a transmission control protocol, and is configured to start a congestion window at a first starting number of segments and to initially increase the congestion window by a predetermined number of segments each time an acknowledgement for a segment is received; and wherein the protocol layer is configured to perform the accelerated start by re-initializing the congestion window to a second starting number of segments greater than the first starting number of segments, and then growing the congestion window at a predetermined rate in response to received positive acknowledgments.

12. A telecommunication system, comprising a plurality of intermediate nodes and also a plurality of telecommunication devices, wherein at least one of the telecommunication devices is as in claim 10.

13. The telecommunication system of claim 12, wherein the protocol layer is a transport layer of real time control protocol layer or other streaming or datagram protocols.

14. The telecommunication system of claim 12, wherein the telecommunication system includes a radio access network.

15. The telecommunication system of claim 12, wherein the telecommunication system includes a wireless telecommunication system using enhanced general packet radio service or uses general packet radio service.

16. The telecommunication system of claim 12, wherein telecommunication system includes a Universal Mobile Telecommunication System network.

17. The telecommunication system of claim 12, wherein the telecommunication system uses code division for providing multiple access.

18. A telecommunication device, comprising:
- means for transmitting segments at a rate of transmission and increasing the rate of transmission at a first rate of increase starting from a first starting point for the rate of transmission, based on feedback in the form of acknowledgements of the transmitted segments;
- means for receiving a message including one or more bits set to a value predetermined to convey an indication of low congestion irrespective of any particular one of the transmitted segments and so not providing feedback in the form of acknowledgements of the transmitted segments; and,
- means for, in response to the indication of low congestion, performing an accelerated start so as to reach maximum throughput in less time by changing to a second starting point greater than the first starting point and greater than the current rate of transmission, and increasing the rate of transmission starting from the second starting point.

* * * * *